(12) United States Patent
Hufford

(10) Patent No.: US 8,517,168 B2
(45) Date of Patent: Aug. 27, 2013

(54) SPRING FOR A VIBRATORY CONVEYOR

(75) Inventor: David W. Hufford, Walla Walla, WA (US)

(73) Assignee: Key Technology, Inc., Walla Walla, WA (US)

(*) Notice: Subject to any disclaimer, the term of this patent is extended or adjusted under 35 U.S.C. 154(b) by 199 days.

(21) Appl. No.: 13/134,894

(22) Filed: Jun. 20, 2011

(65) Prior Publication Data

US 2012/0318643 A1    Dec. 20, 2012

(51) Int. Cl.
*B65G 27/08*    (2006.01)

(52) U.S. Cl.
USPC ..................... 198/752.1; 198/759

(58) Field of Classification Search
USPC ........................... 198/752.1–771
See application file for complete search history.

(56) References Cited

U.S. PATENT DOCUMENTS

| | | | |
|---|---|---|---|
| 2,829,881 A * | 4/1958 | Morris | 267/149 |
| 2,858,008 A | 10/1958 | Dills | |
| 2,876,891 A | 3/1959 | Long et al. | |
| 2,935,177 A * | 5/1960 | Morris | 198/763 |
| 2,969,971 A | 1/1961 | Nelson | |
| 3,272,492 A | 9/1966 | Jones | |
| 3,322,260 A | 5/1967 | Schwenzfeier | |
| 3,380,572 A | 4/1968 | Luger | |
| 3,915,292 A * | 10/1975 | Brown | 198/763 |
| 4,260,052 A * | 4/1981 | Brown | 198/763 |
| 4,278,726 A | 7/1981 | Wieme | |
| 4,795,025 A * | 1/1989 | Doke et al. | 198/763 |
| 5,667,206 A | 9/1997 | Chang | |
| 5,865,297 A * | 2/1999 | Chiba et al. | 198/751 |
| 6,286,658 B1 | 9/2001 | Hufford | |
| 6,655,523 B2 * | 12/2003 | Jones et al. | 198/770 |
| 7,413,073 B2 * | 8/2008 | Narukawa et al. | 198/758 |
| 2004/0251114 A1 * | 12/2004 | Markowski et al. | 198/753 |

* cited by examiner

*Primary Examiner* — Mark A Deuble
(74) *Attorney, Agent, or Firm* — Paine Hamblen, LLP

(57) ABSTRACT

A spring for a vibratory conveyor is described and which includes an elongated substantially planar main body which is mounted on a vibratory conveyor for moving a source of product, and which has a longitudinal axis, and a predetermined spring constant, and wherein the elongated main body can repeatedly flex and twist about the longitudinal axis without substantially degrading the spring constant of the elongated main body.

16 Claims, 3 Drawing Sheets

SPRING FOR A VIBRATORY CONVEYOR

TECHNICAL FIELD

The present invention relates to a spring for use with a vibratory conveyor, and more specifically to a planar or leaf spring which shows a high degree of reliability when the new and novel spring is flexed or twisted about its longitudinal axis.

BACKGROUND OF THE INVENTION

Excited frame vibratory conveying devices are well known in the art. For example, U.S. Pat. No. 4,313,535, shows a typical excited frame conveying apparatus. The teaching of this patent is incorporated by reference herein. Apparatuses of this type include a vibratory drive which is mounted on an elongated frame, and which rests on a factory floor or other supporting structure. Extending upwardly from the frame, and inclined in the direction of the intake or in-feed of the conveyor are a multiplicity of planar shaped, or leaf springs. An elongated conveyor or product transporting bed is mounted on the distal ends of each of these leaf springs and is supported by them in a generally parallel relationship relative to the frame, and in a substantially horizontal orientation. Due to the resiliency of the respective leaf springs, the product conveying bed is capable of moving relative to the underlying supporting frame in response to a force supplied to the bed by the vibratory drive. During the operation of the apparatus, the aforementioned vibratory drive produces an oscillating vibratory force which is typically generated by counter-rotating eccentric weights which are subcomponents of the vibratory drive. Because the vibratory drive is mounted on the frame, it imparts a vibratory motion to the frame, which is then transferred through the attached leaf springs to the conveyor bed. As a result, the product transporting bed vibrates at substantially the same frequency as the vibratory drive and frame. In operation, if the conveyor bed is displaced from its at-rest position, and then allowed to oscillate freely, it will oscillate at substantially its natural, or harmonic frequency. This natural frequency of the bed is dependent, at least in part, upon the combined spring constant, the number of springs supporting the bed, and the mass of the conveyor bed.

As compared with other designs of vibratory conveyors, excited frame conveyors, as a general matter, impart less vibrational and other forces to the underlying floor or other supporting structure because of its relatively light weight, and small vibrational amplitude of the frame as compared to the vibrational amplitude of the product conveying bed. The low level of vibrational force transferred to the surrounding supporting structure is a major advantage of the excited frame vibratory conveyor designs employed in the past.

Heretofore, these aforementioned leaf or planar springs, or so-called "vibratory conveyor arms" have been fabricated using what has been termed as "uni-directional" construction. In particular, filaments of fiberglass, all of which are oriented in spaced, substantially parallel relation, are bonded into a narrowly rectangular cross-sectional shape by the use of resins and epoxies of various types. For example, the product, Scotchply™ which is manufactured by the 3M Company has been utilized, heretofore in the fabrication of these vibratory conveyor arms. Vibratory conveyors utilizing this uni-directional construction are most easily understood by a review of U.S. Pat. No. 6,460,680. In this U.S. patent, the conveyed product travels in a substantially linear direction down the length of the vibratory conveyor bed. The conveyor bed stroke, that is, the resilient oscillating movement of the springs of the bed, is typically about three-eights of an inch in vibratory conveyors of this design. The frame employed with same is typically motionless during operation. It should be understood that the uni-directional construction of the vibratory conveyor arms works well with conveyors of this design for most product conveying applications. The bed and frame mounting brackets (and which are often referred to as arm clips), are mounted respectively on the conveyor frame, and the moveable bed. They are aligned during the fabrication of the conveyor. Misalignment of the two arm clips that couple the vibratory leaf spring to the underlying frame, and overhead conveyor bed will typically result in a premature spring failure. When this occurs, the fiberglass filaments encased within the vibratory conveyor arms will typically break, resulting in a significant reduction in the spring constant associated with the respective vibratory conveyor arms. It should be understood that the spring constant associated with the respective vibratory conveyor arms is the ability of the leaf spring to resist, and then return energy back into the vibrating conveyor system. When the filaments in the individual leaf springs begin to break, a catastrophic failure begins in the overall conveying system. In this regard, the conveyor system load that was being carried by the springs which are now compromised will then be transferred to other conveyor arms. Since the total spring constant has now been compromised with the loss of one vibratory conveyor arm, the bed stroke will usually increase. As the bed stroke increases, stress will increase on the remaining vibratory conveyor arms, and the result will be that more of these structures will begin to break or fail.

As noted, above, the uni-directional type construction of the leaf springs used in a vibratory conveyors such as shown in U.S. Pat. No. 6,460,680 works with a great deal of success. However, the industry has long perceived a need to provide vibratory conveyors of the type described in the aforementioned patent, but which are further operable to move a given product along a non-linear or semi-circular paths of travel. An example of such a construction is shown in U.S. Publication No. 2011/0005896, which identifies a number of inventors including the present inventor, David Hufford. The conveying device as seen in U.S. Publication No. 2011/005896, has a construction which provides or causes semicircular or circular movement of a given conveyed product. The arrangement, as shown in this publication, provides for vibrating circular motion, and the leaf springs employed with same experience to some degree, misalignment and twisting as a function of the normal operations of the described machine. The uni-directional leaf springs as described above have shown that they cannot tolerate a high degree of this motion, and consequently, failures of the leaf springs have been experienced heretofore in this machine design.

Therefore, a perceived need exists for the development of a new leaf spring which may be used on a vibratory conveyor, and which avoids the detriments associated with the use of previous spring constructions employed with the vibratory conveyors shown in the prior art.

BRIEF DESCRIPTION OF THE DRAWINGS

Preferred embodiments of the invention are described, below, with reference to the accompanying drawings.

SUMMARY OF THE INVENTION

A first aspect of the present invention relates to a spring for a vibratory conveyor which includes an elongated substantially planar main body having opposite first and second ends, and which are each mounted on a conveyor for moving a source of a product along a given path of travel, and wherein the elongated main body has a longitudinal axis, and a predetermined spring constant, and wherein the elongated main body can repeatedly flex and twist about the longitudinal axis without substantially degrading the spring constant of the elongated main body.

Still another aspect of the present invention relates to a spring for a vibratory conveyor which includes an elongated main body, having opposite first and second ends, and which further has a longitudinal axis, and wherein the elongated main body has a central core formed of a multiplicity of substantially longitudinally oriented and pretensioned glass fibers which are cured and encased within an epoxy material, and wherein the central core has a top and bottom facing surface; a layer of adhesive deposited on the top and bottom facing surface of the central core of the elongated main body; and a top and bottom outwardly facing skin surface which are respectively adhered to the top and bottom facing surface of the central core by the layer of adhesives which are respectively deposited thereon, and wherein the top and bottom outwardly facing skin surfaces are each formed of a woven fiberglass weft which is oriented at about 45 degrees relative to the longitudinal axis of the elongated main body, and which is further sandwiched between and bonded to overlying layers of longitudinally oriented, and pretensioned glass fibers which are cured and encased within an epoxy material.

These and other aspects of the present invention will be discussed in greater detail hereinafter.

DETAILED DESCRIPTION OF THE PREFERRED EMBODIMENTS

This disclosure of the invention is submitted in furtherance of the constitutional purposes of the U.S. Patent Laws "to promote the progress of science and useful arts" [Article I, Section 8].

Figure 1:
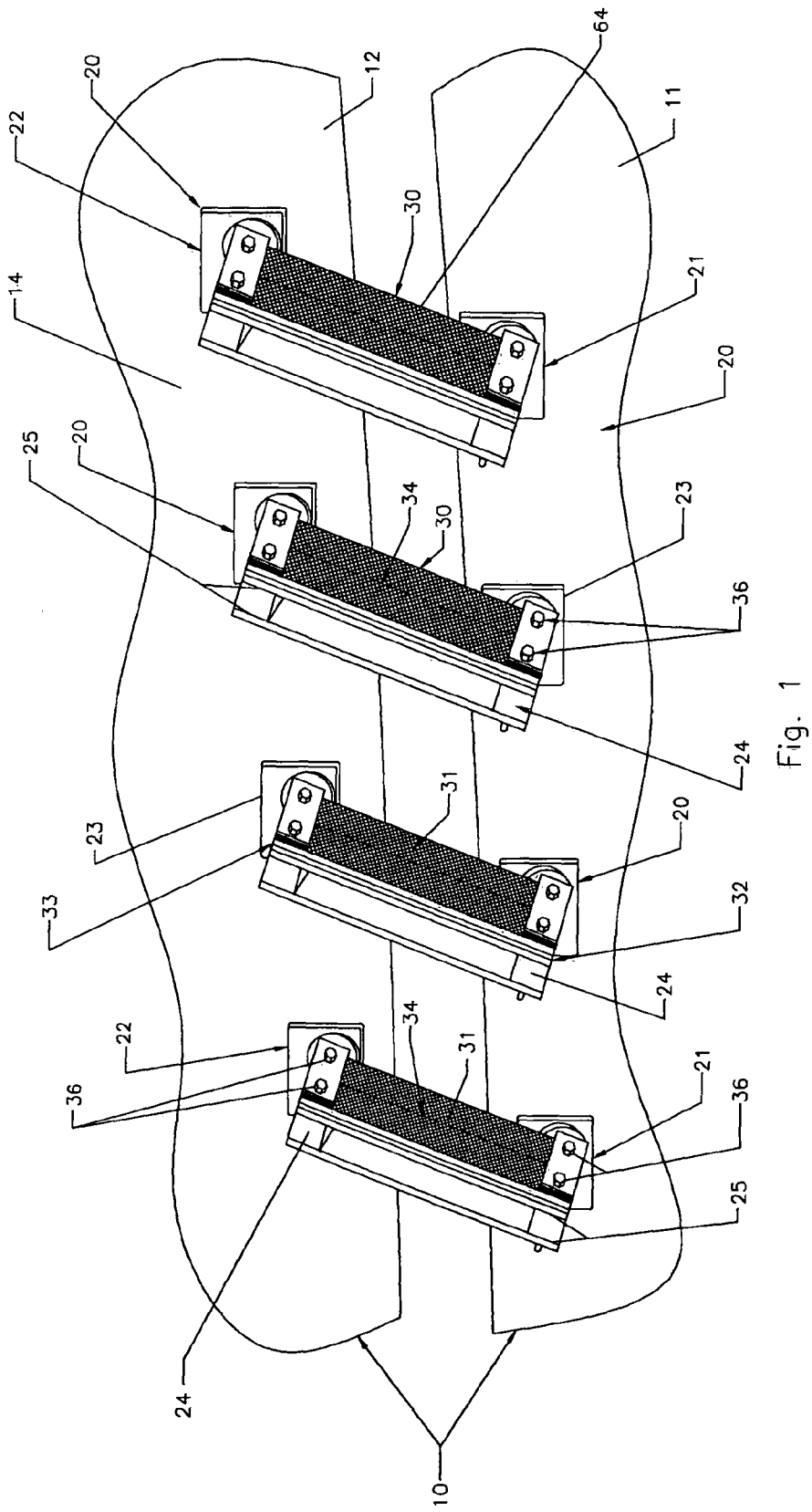
FIG. 1 is a fragmentary, perspective, side elevational view of a vibratory conveyor employing the novel springs of the present invention.

Turning now to FIG. 1, a fragmentary perspective, side elevational view of a vibratory conveyor is shown, and which is generally indicated by the numeral 10. The vibratory conveyor includes a frame or base number 11 which is typically supported on a factory floor, or suspended from an overhead factory ceiling (not shown). The base further mounts an overlying product transporting bed 12, which is disposed in a predetermined, parallel, spaced relationship relative thereto. The product transporting bed 12 is operable to transport or move a product (not shown) along a linear path of travel similar to that seen in U.S. Pat. No. 6,460,680 which is incorporated herein by reference, or along a non-linear, or semicircular or circular path of travel as seen in U.S. Publication No. 2011/005896, which was discussed earlier in this Application. The frame for base number 11 is defined, at least in part, by a sidewall 13, and further the product transporting bed 12 has a sidewall 14 which is spaced therefrom. As best illustrated in FIG. 1, mounting fixtures or arm chips which are generally indicated by the numeral 20 are mounted on the respective frame 11, or product transporting bed 12. The mounting fixtures include a first or lower mounting fixture 21, and a second, or upper mounting fixture 22. As seen in this drawing, the first or lower mounting fixture 21 is affixed in a predetermined location on the sidewall 13 of the Frame 11, and the second or upper mounting fixture 22 is attached to the sidewall 14, of the bed 12. These respective mounting fixtures 20 are disposed in substantially linear alignment, one with the other. Each of the respective mounting fixtures 20, has a base portion 23 which is affixed to the respective sidewalls 13 or 14, as the case may be, by traditional fastening techniques including the use of screw-threaded fasteners, or most typically by welding. Extending normally outwardly relative to the base portion 23 is a mounting post 24 which has either a square or narrowly rectangular shape. The respective mounting posts 24, have opposing sidewalls 25, through which a pair of apertures of a given cross-sectional dimension are formed therethrough (not shown).

Figure 2:
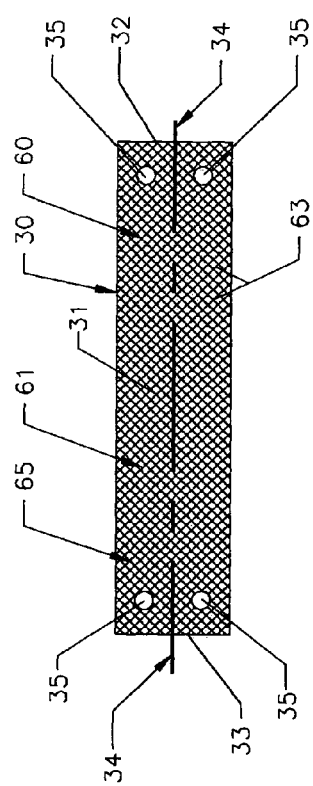
FIG. 2 is a top plan view of a spring of the present invention.

Referring now to FIGS. 1 and 2, the novel spring for a vibratory conveyor of the present invention is generally indicated by the numeral 30. The spring 30 has an elongated, substantially planar main body 31, having opposite first and second ends, 32 and 33, respectively, and which are each mounted on the vibratory conveyor 10 by means of the aligned pairs of mounting fixtures 20. As discussed, above, the vibratory conveyor 10 is used for moving a source of product (not shown) along a given path of travel which may be either linear, or non-linear. As seen in the drawings, the spring of the present invention 30, has a longitudinal axis, which is generally indicated by the numeral 34 and further has a predetermined spring constant. The elongated main body 31 of the present invention can repeatedly flex, and twist about the longitudinal axis 34, without substantially degrading the spring constant of the elongated main body. This performance characteristic is quite different from the prior art springs used with vibratory conveyor designs, as discussed in previously issued patents or publications and which could take little, or no twisting or flexing about their longitudinal axes before damage began to occur to the respective supporting leaf springs. As seen in the drawings, and specifically with respect to FIG. 2, a pair of apertures 35, are formed in each of the first and second ends 32 and 33, so as to receive a fastener 36, which passes therethrough (FIG. 1), and which affixes the elongated main body 31 to the individual mounting fixtures 20 which are themselves, made integral with, or otherwise secured to, the respective frame and associated product transporting bed, 11 and 12, respectively.

Figure 3:
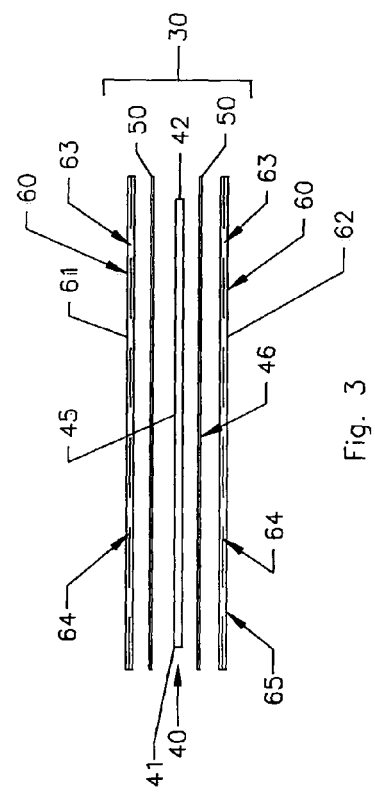
FIG. 3 is an exploded, side elevational view of a spring of the present invention.
Figure 4:
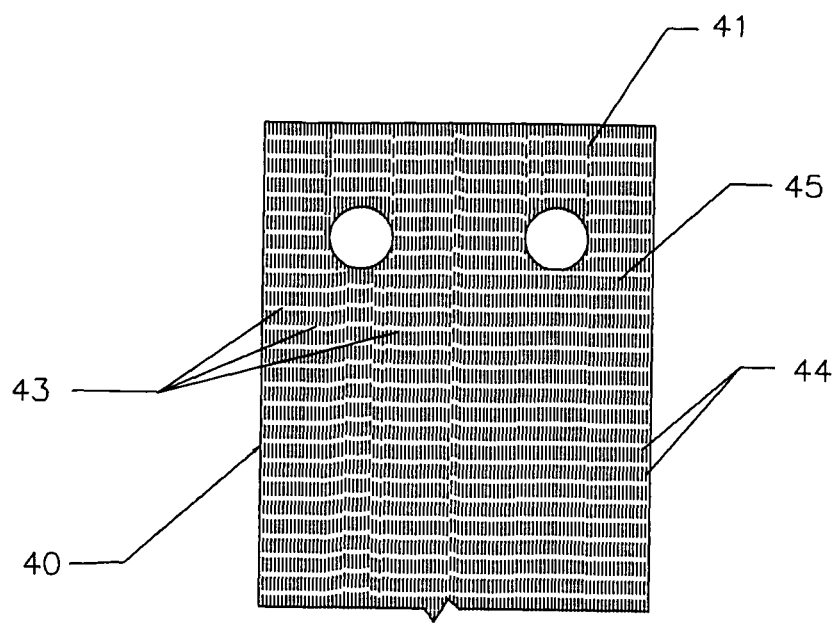
FIG. 4 is a fragmentary top view of a central core portion of the spring of the present invention.
Figure 5:
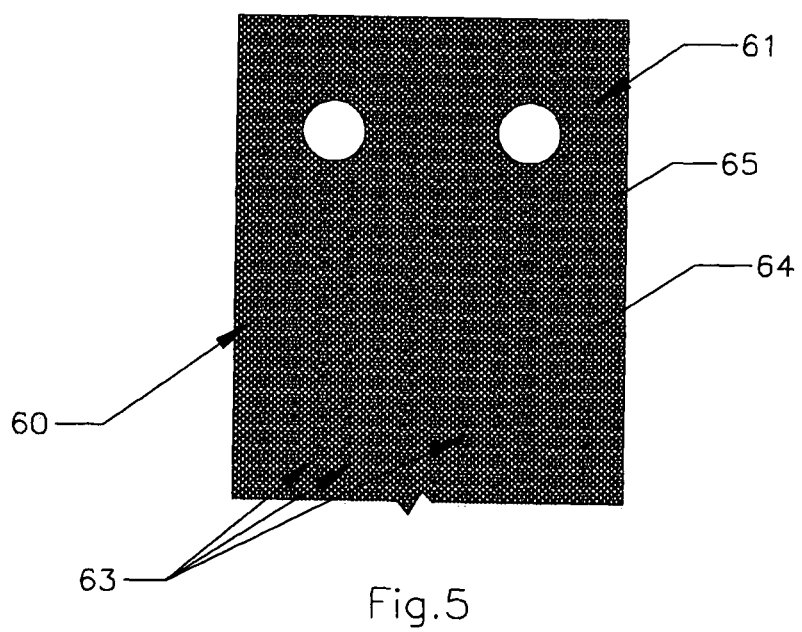
FIG. 5 is a fragmentary, greatly enlarged, top plan view of a portion of a spring of present invention.

Referring now to FIGS. 3 and 4, it should be understood that the new spring 30 of the present invention includes a central core 40 having opposite first, and second ends 41 and 42 respectively. The central core 40 further comprises a multiplicity of elongated, longitudinally oriented, spaced, and pre-tensioned glass fibers 43, which are cured and otherwise encased within an epoxy, resin, or other synthetic or plastomeric compound or material 44. The central core 40 has a top facing surface 45, and an opposite bottom facing surface 46. In the arrangement as seen in the drawings, the central core 40 is fabricated to be about 0.085" thick, and in the arrangement as seen in the drawings (FIG. 3), a thin adhesive layer 50 is deposited thereon, and is used to attach or secure the central core to other, adjacent or overlying structures which are discussed in the paragraphs which follow.

The spring 30 of the present invention, includes a pair of spaced, outwardly facing skin surfaces which are generally indicated by the numeral 60. The outwardly facing skin surfaces comprise a first, or top skin surface 61; and a second or bottom skin surface 62. As will be understood from a study of FIG. 3, the elongated main body of the central core 40 is sandwiched between, and adhered to, the pair of outwardly facing skin surfaces 60. The respective first and second skin surfaces 61, and 62, are each formed of a woven fiberglass weft 63 which is oriented at about 45 degrees relative to the longitudinal axis 34, as best seen in FIG. 2. The woven fiberglass weft 63 is further sandwiched between, and bonded to, overlying or juxtaposed layers 64 of a multiplicity of longitudinally aligned and pre-tensioned glass fibers which are, themselves, cured and encased within an epoxy, resin, or other synthetic and/or plastomeric material. The overlying layers of longitudinally aligned and pre-tensioned glass fibers which are encased within the epoxy material 65 are fused or made integral together with the woven fiberglass weft 63 which is positioned therebetween, and are then secured to the central core 40 by the adhesive layers 50, as earlier discussed. In the arrangement as seen in the drawings, the top and bottom outwardly facing skin surfaces 61 and 62 of the elongated main body each have a thickness dimension of about 0.075 inches. Still further, the elongated main body of the spring 31 has a longitudinal length of about 11 inches, and a transverse dimension of about 2.5 inches. As earlier discussed, it has been discovered, that under the normal operating conditions of the vibratory conveyor 10, the spring 30 can repeatedly flex and twist about the longitudinal axis 34 without seriously degrading the spring constant of the spring. In this arrangement, the vibratory conveyor 10, which is only fragmentarily shown in FIG. 1, can convey a stream of product (not shown) along both linear, and non-linear courses of travel which is advantageous for various manufacturing processes such as what is illustrated and discussed in the prior art. It has also been discovered that the construction of this novel spring 30 results in a spring 30, which may resiliently flex and/or twist about the longitudinal axis 34 while simultaneously moving along or within a stroke distance as measured from an at rest position, to a displaced position, and then back to the position of rest, which is greater than about three-eighths of an inch with no apparent adverse effects occurring to the internal structure of the spring 30.

OPERATION

The operation of the described embodiment of the present invention is believed to be readily apparent and is briefly summarized at this point.

In its broadest aspect, the present invention relates to a spring 30 for a vibratory conveyor 10, and which includes an elongated, substantially planar main body 31 having opposite first and second ends 32 and 33, and which are each mounted on a vibratory conveyor 10 for moving a source of product (not shown) along a given path of travel, and wherein the elongated main body 31, has a longitudinal axis 34, and a predetermined spring constant, and wherein the elongated main body can repeatedly flex and twist about the longitudinal axis 34 without substantially degrading the spring constant of the elongated main body.

More specifically, the present invention relates to a spring 30 for a vibratory conveyor 10, and which includes an elongated main body 31 having opposite first and second ends 32 and 33, respectively, and which has a longitudinal axis 34. The elongated main body 31 has a central core 40 which is formed of a multiplicity of substantially longitudinally oriented, spaced, and pre-tensioned glass fibers 43 which are cured, and encased with an epoxy, resin, or other synthetic material 44. The central core 40 has a top and bottom surface 45 and 46 respectively. A layer of adhesive 50 is located or otherwise deposited on the top and bottom facing surfaces 45 and 46 of the central core 40 which forms a feature of the elongated main body 31. Still further, a top and bottom outwardly facing skin surface 61 and 62, respectively, are individually adhered to the top and bottom facing surfaces 45 and 46 of the central core 40 by the layer of adhesive 50, which is deposited thereon. The top and bottom outwardly facing skin surfaces 61 and 62, respectfully, are each formed of a woven fiberglass weft 63, which is oriented at about 45 degrees relative to the longitudinal axis 34 of the elongated main body 31, and which is further sandwiched between and bonded to overlying layers of longitudinally oriented, spaced and pre-tensioned glass fibers 64 which are themselves cured and encased with an epoxy material 65.

As discussed earlier, it has been discovered that the elongated main body 31 can repeatedly flex and twist about the longitudinal axis 34 without substantially degrading the spring constant of the elongated main body 31. This is quite an advantageous and novel development for springs of this type inasmuch as previous spring constructions would rapidly operationally degrade when exposed to flexing and twisting along their respective longitudinal axis and subsequently cause vibratory conveyor failure.

Therefore, it will be seen that the present invention provides a convenient means whereby vibratory conveyors of various designs, and shapes may be fabricated and which can transport a product along assorted paths of travel which includes linear, non-linear and combinations of linear and non-linear courses.

In compliance with the statute, the present invention has been described in language more or less specific as to structural and methodical features. It should be understood, however, that the invention is not limited to the specific features shown and described since the means herein disclosed comprise preferred forms of putting the invention into effect. The invention is, therefore, claimed in any of its forms or modifications within the proper scope of the appended claims which are appropriately interpreted in accordance with the Doctrine of Equivalents.

I claim:

1. A spring for a vibratory conveyor, comprising:
an elongated substantially planar main body having opposite first and second ends and which are each mounted on a conveyor for moving a source of product along a given path of travel, and wherein the elongated main body has a longitudinal axis, and a predetermined spring constant, and wherein the elongated main body can repeatedly and resiliently flex, and twist about the longitudinal axis without substantially degrading the spring constant of the elongated main body, and wherein the elongated main body has a central core which is sandwiched between, and adhered to, a pair of spaced, outwardly facing skin surfaces, and wherein the central core comprises a multiplicity of elongated, longitudinally oriented, spaced and pretensioned glass fibers which are cured, and encased in an epoxy material.

2. A spring for a vibratory conveyor as claimed in claim 1, and wherein the central core material is about 0.085 inches thick, and has top, and bottom, outwardly facing surfaces which are coated with an adhesive, and which binds the pair of outwardly facing skin surfaces to the central core.

3. A spring for a vibratory conveyor as claimed in claim 2, and wherein the pair of spaced, outwardly facing skin surfaces are each formed of a woven fiberglass weft which is oriented at about 45 degrees relative to the longitudinal axis of the elongated main body, and which is further sandwiched between, and bonded to, overlying layers of longitudinally aligned, spaced and pretensioned glass fibers which are cured and encased within an epoxy material.

4. A spring for a vibratory conveyor as claimed in claim 2, and wherein spring may repeatedly, and resiliently flex and/or twist about the longitudinal axis and simultaneously move along a stroke distance of greater than about 3/8 of an inch.

5. A spring for a vibratory conveyor as claimed in claim 1, and wherein the vibratory conveyor conveys a stream of product along both linear and non-linear paths of travel.

6. A spring for a vibratory conveyor as claimed in claim 1, and wherein the vibratory conveyor conveys a stream of product in a substantially linear direction.

7. A spring for a vibratory conveyor as claimed in claim 1, and wherein the vibratory conveyor conveys a stream of product along a non-linear path of travel.

8. A spring for a vibratory conveyor, comprising:
an elongated main body having opposite first and second ends, and which further has a longitudinal axis, and wherein the elongated main body has a central core formed of a plurality of substantially longitudinally aligned, spaced, and pretensioned glass fibers which are cured, and encased within, an epoxy material, and wherein the central core has a top and bottom facing surface;
a layer of adhesive deposited on the top and bottom facing surface of the central core of the elongated main body; and
a top and bottom outwardly facing skin surface which are individually adhered to the top and bottom surface of the central core by the layer of adhesive which is respectively deposited thereon, and wherein the top and bottom outwardly facing skin surfaces are each formed of a woven fiberglass weft which is oriented about 45 degrees relative to the longitudinal axis of elongated main body, and which is further sandwiched between, and bonded to, overlying layers of a multiplicity of longitudinally aligned and pretensioned glass fibers which are cured, and encased within an epoxy material.

9. A spring for a vibratory conveyor as claimed in claim 8, and wherein central core material is about 0.085 inches thick.

10. A spring for a vibratory conveyor as claimed in claim 8, and wherein the top and bottom outwardly facing skin surfaces of the elongated main body each have a thickness dimension of about 0.075 inches.

11. A spring for a vibratory conveyor as claimed in claim 8, and wherein the elongated main body is narrowly rectangular, and planar, and further has a longitudinal length of about 11 inches, and a transverse dimension of about 2.5 inches.

12. A spring for a vibratory conveyor as claimed in claim 8, and wherein a pair of apertures are formed in each of the first and second ends of the elongated main body, and wherein the apertures are sized so as receive a fastener which passes there-though each of the apertures, and which releasably affixes the elongated main body of the spring to the vibratory conveyor.

13. A spring for a vibratory conveyor as claimed in claim 8, and wherein the elongated main body of the spring has a spring constant, and wherein under normal operating conditions of the vibratory conveyor, the spring can repeatedly flex and twist about the longitudinal axis without substantially degrading the spring constant of the spring.

14. A spring for a vibratory conveyor as claimed in claim 8, and wherein the vibratory conveyor conveys a stream of products along both linear and non-linear paths of travel.

15. A spring for a vibratory conveyor as claimed in claim 8, and wherein the vibratory conveyor conveys a stream of products in a substantially linear direction.

16. A spring for a vibratory conveyor as claimed in claim 8, and wherein the vibratory conveyor conveys a stream of products in a non-linear path of travel.

* * * * *

UNITED STATES PATENT AND TRADEMARK OFFICE
CERTIFICATE OF CORRECTION

PATENT NO. : 8,517,168 B2  
APPLICATION NO. : 13/134894  
DATED : August 27, 2013  
INVENTOR(S) : David W. Hufford It is certified that error appears in the above-identified patent and that said Letters Patent is hereby corrected as shown below:

In the Specification

Column 2, line 42, "U.S. Publication No. 2011/005896" should read --U.S. Publication No. 2011/0005896--.

Column 3, line 6, "a portion of a spring of present invention." should read --a portion of a spring of the present invention.--.

Column 3, line 63, "No. 2011/005896" should read --No. 2011/0005896--.

Signed and Sealed this  
Twenty-seventh Day of May, 2014

Michelle K. Lee  
*Deputy Director of the United States Patent and Trademark Office*